April 10, 1945.   F. T. ORRINGTON   2,373,592
AIR COOLED SMOKING PIPE
Filed Nov. 17, 1943
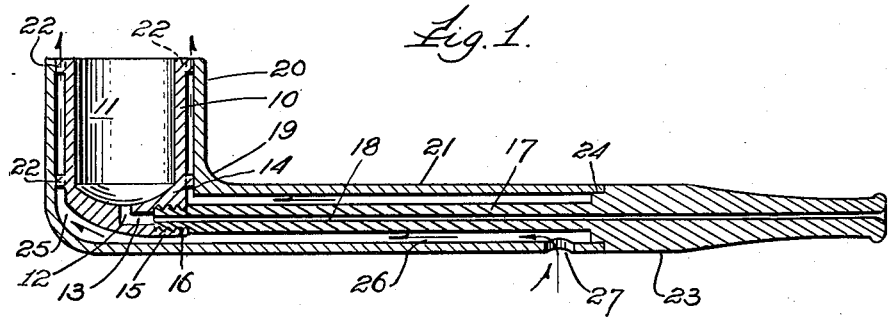
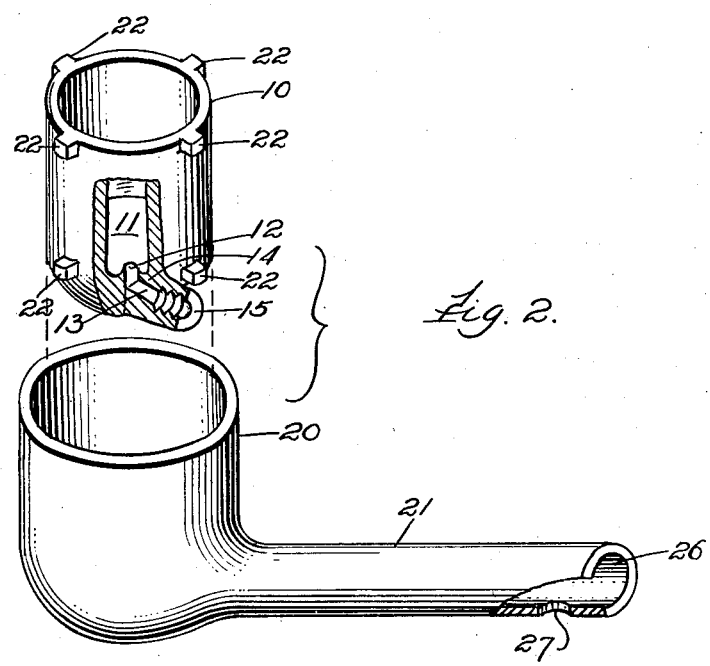
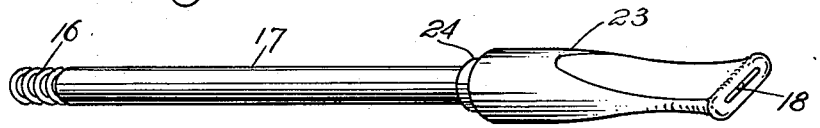
Inventor:
Floyd T. Orrington.
by James P. McKnight
Attorney.

Patented Apr. 10, 1945

2,373,592

UNITED STATES PATENT OFFICE 2,373,592

AIR-COOLED SMOKING PIPE

Floyd T. Orrington, Chicago, Ill., assignor of one-half to Philip Shaiman, Chicago, Ill.

Application November 17, 1943, Serial No. 510,838

1 Claim. (Cl. 131—196)

This invention relates to a pipe for smoking, which is so constructed that the heated portions of the bowl and stem by which the pipe is held by the smoker, and which are unbearably hot in ordinary pipes, are cooled by aeration for comfortable handling.

Pipe smokers when they have withdrawn their pipes from their mouths like to hold them in their hands, rather than place them on a table or other support. Many pipe smokers regard their pipes as companions and enjoy holding them. After the ordinary pipe has been smoked for a certain length of time, the heat from the glowing coal of tobacco in the bowl, and the heated smoke passing through the stem tend to make the bowl and inner stem portion so hot that the pipe cannot be held. Since these are the natural places to hold the pipe, it must be put down.

It is among the objects of this invention to solve this problem and to provide a pipe so constructed that the bowl and stem will never become so uncomfortably hot that it cannot be held, no matter how long it is smoked.

It is an object of my invention to construct a pipe with an aeration circuit so that there is a continuous natural passage of air therethrough to cool the bowl and stem so that the pipe may be comfortably handled at all times.

My invention also contemplates such other advantages and capabilities as will later more fully appear and which are inherently possessed by my invention.

While I have shown in the accompanying drawing a preferred form of my invention, yet I desire it understood that the same is susceptible of modification and change without departing from the spirit of my invention.

Referring now to the drawing, Fig. 1 is a longitudinal sectional view of my pipe; Fig. 2 is a perspective view of the inner and outer bowls with portions broken away and sectioned and Fig. 3 is a perspective view of the stem and mouthpiece of my pipe.

Referring now to the embodiment selected to illustrate my invention, I provide an inner bowl 10 having a fire pit 11 for the tobacco, and a bottom opening 12 communicating with passageway 13. Walls 14 at the inner end 15 of passageway 13 are screw threaded and are adapted to receive and engage screw threaded extension 16 of inner stem member 17. Within stem member 17 is smoke passage 18 communicating with passageway 13.

An outer shell 19 has a bowl portion 20 and a stem portion 21. The inner bowl 10 is positioned within bowl portion 20 of shell 19. Inner bowl 10 has a plurality of spaced guide lugs 22 that space the inner bowl 10 from the bowl portion 20 of outer shell 19.

Preferably integral with stem 17 is an enlarged mouth piece portion 23, having a shoulder 24 which receives the end of the stem portion 21 of the shell 19. This construction centrally positions stem 17 within stem portion 21 of outer shell 19, and also provides a sealed tight construction.

Between bowl portion 20 and bowl 10 is space 25 leading upwardly to the atmosphere and downwardly communicating with passage 26 between inner stem 17 and outer stem portion 21.

An entrance 27 is provided adjacent the bottom portion of the end of stem portion 21 of shell 20 communicating with passage 26.

With this construction in use, cold air drawn by the heat in the bowl 10 caused by the burning of the tobacco, enters entrance 27, moves into passage 26, continues into space 25 between the inner bowl 10 and the outer bowl portion 20, continues upwardly as it is heated and finally passes out at the open top between the bowls. This sets up a continuous circuit of air, drawing more cold air into the entrance 27 and thence through passage 26 and space 25 to continuously cool the heated portions of the bowl and stem. The smoker may continue to retain his pipe in his hand as long as he desires, without danger of being burned or made uncomfortable by contact with overheated portions of the pipe. The companionship of a man and his pipe is uninterrupted and maximum enjoyment from restful smoking is realized.

Having thus described my invention, I claim:

An air cooled smoking pipe comprising an outer shell having bowl and stem portions, an inner bowl positioned within said bowl portion of said shell, said inner bowl having at its upper and lower portions a plurality of integral spaced lugs, for spacing said inner bowl from said bowl portion of said shell to provide a continuous vertical air space therebetween, said inner bowl and said bowl portion of said shell being open at their upper ends to permit said space to communicate with the atmosphere, said inner bowl having a fire pit, a vertically extending bottom opening communicating with said fire pit, and a screw threaded horizontal passageway communicating with said bottom opening, a hollow inner stem having a screw threaded inner end adapted to interengage with the screw threaded horizontal passageway of said inner bowl and communicating therewith, said stem being spaced from the stem portion of said outer shell to provide a horizontal passage therebetween extending the length of said stem, said inner bowl being spaced from the outer stem so that the horizontal passage continues under the bottom of said inner bowl, said horizontal passage communicating with the vertical space between said inner and outer bowls, said inner stem having an integral mouth-piece portion at its outer end, said mouthpiece portion being enlarged to bear against the outer end of said stem portion of said shell and seal said passage, said stem portion of said outer shell having an opening adjacent its bottom end portion leading to the atmosphere and communicating with the horizontal passage, so that as said pipe is heated by smoking, cold air drawn in said opening moves into the horizontal passage, passes under the heated bottom of said inner bowl into the vertical space and then out through the open top, to continuously cool said bowl and stem portions of said outer shell for comfortable handling.

FLOYD T. ORRINGTON.